W. C. MARSH.
VALVE.
APPLICATION FILED FEB. 20, 1909.
941,934.
Patented Nov. 30, 1909.
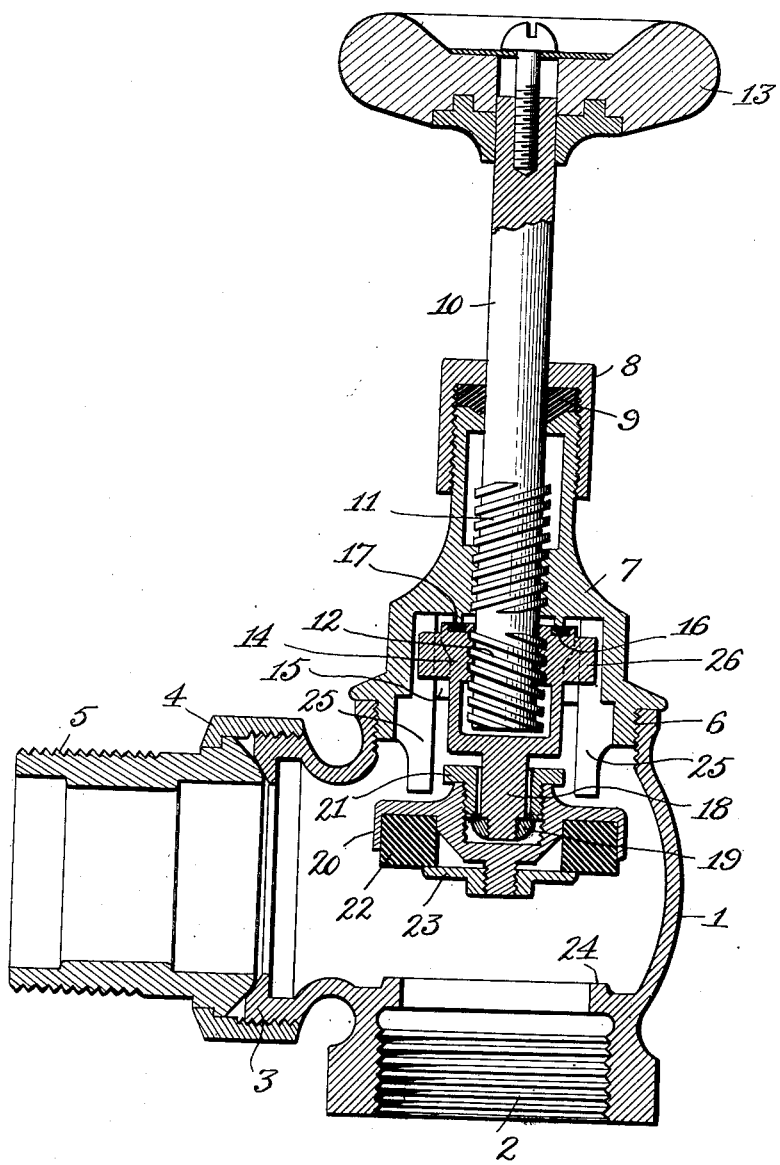
Witnesses
Inventor
William C. Marsh
By Percy B. Hills
Attorney

UNITED STATES PATENT OFFICE.

WILLIAM C. MARSH, OF DUNKIRK, NEW YORK.

VALVE.

941,934.

Specification of Letters Patent. Patented Nov. 30, 1909.

Application filed February 20, 1909. Serial No. 479,109.

*To all whom it may concern:*

Be it known that I, WILLIAM C. MARSH, a citizen of the United States, residing at Dunkirk, county of Chautauqua, State of New York, have invented new and useful Improvements in Valves, of which the following is a specification.

My invention relates to valves, more especially adapted for use with radiators, and has for its object to provide a quick opening and closing valve of novel construction embodying not only a main closure but also a closure for preventing leakage through the valve stem or stuffing box when the main valve is open.

In the accompanying drawing: The figure is a central vertical sectional view of my improved valve.

In the said drawing the reference numeral 1 denotes the body of a radiator valve, having the interiorly threaded inlet aperture 2 for the reception of the supply pipe, and the exteriorly threaded discharge 3, to which may be connected, by a union nut 4, a short threaded pipe section or nipple 5, for connection with a radiator. The upper side of the body 1 is apertured and interiorly screw-threaded at 6 to receive a bonnet piece 7, which in turn carries a packing nut 8 at its upper end, between which and the upper end of said bonnet piece a packing 9 is interposed.

Passing centrally through the packing nut 8 and packing 9 and extended into the bonnet piece 7 is a valve stem 10 provided intermediate its length with a right-hand screw thread 11, and at its lower end with a similarly pitched left-hand screw thread 12, a slight intervening space being left between said screw threads as shown. Said upper screw thread is in threaded engagement with the bonnet piece 7 so that the stem 10 will move up and down in said bonnet piece when rotated through a suitable handle 13, while the screw thread 12 thereof is in threaded engagement with a disk holder, 14 located within a chamber 15 formed in the bonnet piece 7, said disk holder 14 having on its upper surface an annular recess adapted to receive a suitable hard packing disk 16, which, when said disk holder is in its uppermost position contacts with an annular seat 17 formed on the bonnet piece 7 around the stem 10. The reduced lower end 18 of the disk holder 14 has screwed thereon an enlarged nut 19 rounded on its underside, as shown, over which fits a main valve disk holder 20, the same being retained in position by an apertured nut 21 loosely surrounding the reduced lower end 18 of disk holder 14 and screwed into said main valve disk holder 20. The lower surface of said main valve disk holder 20 is recessed annularly to receive a suitable hard packing disk 22, which is retained in position by a washer 23, said packing disk being adapted to engage a valve seat 24 in the body 1 when said valve disk holder is in its lowermost position. The interior of the bonnet piece 7 is formed with suitable downwardly projecting guides 25 within which move vertically suitable lugs 26 projecting from the sides of the upper disk holder 14, whereby rotary motion of the latter is prevented.

In operation, a rotation to the right of stem 10 will, through thread 11, cause a bodily downward movement of said stem and the two disk holders 14 and 20, and, through thread 12, cause an additional separate downward movement of said disk holders, so that lower valve disk holder 20 will move from the completely open to the closing position under one-half the bodily movement of stem 10. In opening, the movement of stem 10 is reversed, with a similar augmented speed of the disk holders seating the packing disk 16 against its seat 17 and effectually preventing the escape of fluid through the bonnet piece 7.

It will be observed that by means of the connection between the main valve disk holder 20 and the lower end 18 of upper disk holder 14 a slight universal rocking motion is permitted to said main valve disk holder, whereby an accurate seating of the packing disk 22 thereof on valve seat 24 is insured. By forming the two disk holders 14 and 20 separate either of the same may be replaced by a new one without the necessity of replacing the other.

Having thus described my invention, what I claim as new and desire to secure by Letters Patent is:

1. A valve, embodying a casing, a stem rotatable in said casing, oppositely disposed seats in said casing, and two disk holders formed separately from each other and from said stem and connected to each other, said disk holders carrying disks for engaging said seats and adapted to be moved longitudinally by the rotation of said stem.

2. A valve, embodying a casing, a stem bodily movable in said casing through a screw threaded engagement therewith, oppositely disposed seats in said casing, and two disk holders formed separately from each other and from said stem and connected to each other, said disk holders carrying disks for engaging said seats and being together carried by said stem.

3. A valve, embodying a casing, a stem bodily movable in said casing through a screw threaded engagement therewith, oppositely disposed seats in said casing, and two disk holders formed separately from each other and from said stem and connected to each other, said disk holders carrying disks for engaging said valve seats and being together carried by said stem and movable therewith without rotation.

4. A valve, embodying a casing, a stem bodily movable in said casing through a screw threaded engagement therewith, oppositely disposed seats in said casing, and two disk holders formed separately from each other and from said stem and having a universal rocking connection with each other, said disk holders carrying disks for said valve seats and being together carried by said stem.

5. A valve, embodying a casing, a stem bodily movable in said casing through a screw threaded engagement therewith, oppositely disposed seats in said casing, two disk holders formed separately from each other and from said stem and connected with each other, said disk holders carrying disks for said seats and being together carried by said stem, and means for moving said disk holders, when moved by said stem, at a speed greater than that of said stem.

In testimony whereof I have hereunto set my hand in the presence of two subscribing witnesses.

WILLIAM C. MARSH.

Witnesses:
 FRED J. REED,
 J. L. HURLBERT.